(12) United States Patent
Tsukui

(10) Patent No.: US 11,213,954 B2
(45) Date of Patent: Jan. 4, 2022

(54) WORKPIECE IDENTIFICATION METHOD

(71) Applicant: TOYOTA JIDOSHA KABUSHIKI KAISHA, Toyota (JP)

(72) Inventor: Akira Tsukui, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 93 days.

(21) Appl. No.: 16/847,939

(22) Filed: Apr. 14, 2020

(65) Prior Publication Data

US 2020/0368923 A1    Nov. 26, 2020

(30) Foreign Application Priority Data

May 21, 2019   (JP) .............................. JP2019-095271

(51) Int. Cl.
*B25J 9/16* (2006.01)
*G05B 19/418* (2006.01)
*B25J 9/00* (2006.01)
*B25J 15/02* (2006.01)

(52) U.S. Cl.
CPC .......... *B25J 9/1697* (2013.01); *B25J 9/1612* (2013.01); *B25J 15/0206* (2013.01); *G05B 19/4183* (2013.01); *B25J 9/0096* (2013.01); *G05B 2219/40* (2013.01); *G05B 2219/40053* (2013.01); *G05B 2219/40543* (2013.01)

(58) Field of Classification Search
CPC .... B25J 9/1697; B25J 9/1612; B25J 15/0206; B25J 9/0096; G05B 19/4183; G05B 2219/40; G05B 2219/40053; G05B 2219/40543; G05B 2219/39484; Y02P 90/02; G06K 9/00671; G06K 2209/19
See application file for complete search history.

(56) References Cited

U.S. PATENT DOCUMENTS

| | | | |
|---|---|---|---|
| 2004/0019405 A1* | 1/2004 | Ban ........................... | G06T 7/74 700/213 |
| 2013/0238124 A1* | 9/2013 | Suzuki ................... | B25J 9/1697 700/250 |
| 2014/0028040 A1* | 1/2014 | Oda ...................... | B25J 15/0004 294/115 |
| 2017/0121113 A1* | 5/2017 | Wagner ............... | G06K 7/10693 |
| 2018/0194573 A1* | 7/2018 | Iwai ........................ | B25J 9/1697 |
| 2018/0236664 A1* | 8/2018 | Ando ...................... | B25J 9/1697 |

(Continued)

FOREIGN PATENT DOCUMENTS

| | | |
|---|---|---|
| JP | 2010069542 A | 4/2010 |
| JP | 2018202593 A | 12/2018 |

*Primary Examiner* — Robert T Nguyen
(74) *Attorney, Agent, or Firm* — Dickinson Wright, PLLC

(57) ABSTRACT

Whether or not workpieces are present in a workpiece storage area is determined based on an image acquired by image capturing. When the workpieces are determined to be present, whether or not a crossing part is present in the workpiece storage area is determined based on the image, the crossing part being a part where soft body portions of a plurality of workpieces cross each other in an overlapping manner. When the crossing part is determined to be present, an uppermost soft body portion placed at an uppermost position among the soft body portions crossing each other is determined based on the image. A workpiece including the uppermost soft body portion thus determined is determined as an uppermost workpiece placed at an uppermost position.

5 Claims, 8 Drawing Sheets

(56) References Cited

U.S. PATENT DOCUMENTS

2018/0250820 A1* 9/2018 Shimodaira ............. G06F 30/23
2018/0333857 A1* 11/2018 Ando ..................... B25J 13/088
2020/0353583 A1* 11/2020 Tsukui ............... B23Q 17/2471

* cited by examiner

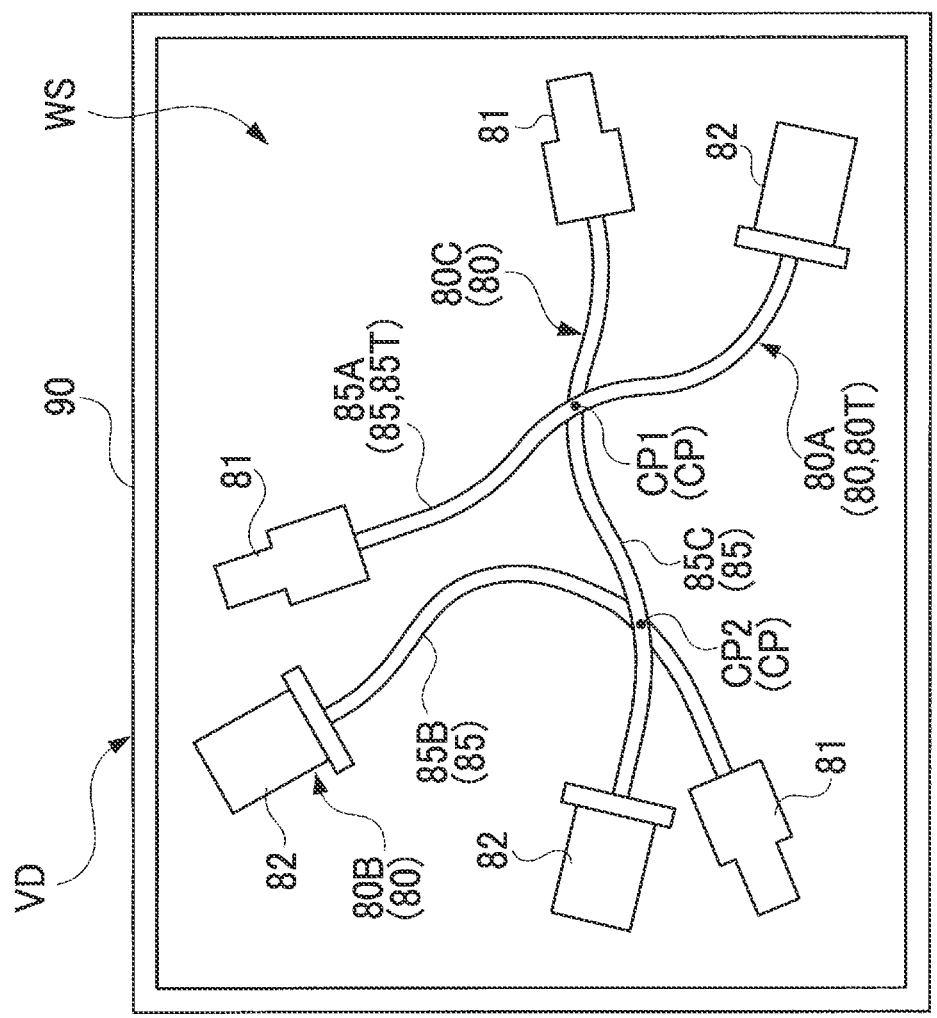

WORKPIECE IDENTIFICATION METHOD

INCORPORATION BY REFERENCE

The disclosure of Japanese Patent Application No. 2019-095271 filed on May 21, 2019 including the specification, drawings and abstract is incorporated herein by reference in its entirety.

BACKGROUND

1. Technical Field

The present disclosure relates to a workpiece identification method.

2. Description of Related Art

Japanese Unexamined Patent Application Publication No. 2010-69542 (JP 2010-69542 A) discloses a workpiece picking method as described below. More specifically, workpieces loaded in bulk are measured three-dimensionally by a range sensor, and a measurement result obtained herein is compared with a three-dimensional CAD model for the workpieces, so that a three-dimensional position and a posture of each workpiece are individually recognized. After that, the workpiece the three-dimensional position and the posture of which are thus recognized is picked by a robotic hand.

SUMMARY

In the meantime, a workpiece constituted by a rigid body portion and a soft body portion having a free line shape is taken as a picking target in some cases. Such a workpiece is, for example, a wire harness constituted by a connector as a rigid body portion and a cable as a soft body portion having a free line shape. When such workpieces are loaded in bulk, it is sometimes difficult to pick an individual workpiece appropriately by the picking method described in JP 2010-69542 A.

More specifically, first, in a workpiece constituted by a rigid body portion and a soft body portion having a free line shape, three-dimensional CAD data is made for the rigid body portion, but no three-dimensional CAD data is made for the soft body portion having a free line shape (in other words, an amorphous shape). On this account, in a case where three-dimensional measurement data of the workpiece is compared with three-dimensional CAD data like JP 2010-69542 A, the three-dimensional measurement data is compared with the three-dimensional CAD data in terms of the rigid body portion for which the three-dimensional CAD data is made, and hereby, a three-dimensional position and a posture of the rigid body portion are recognized. Accordingly, in terms of the soft body portion for which no three-dimensional CAD data is made, a three-dimensional position and a posture of the soft body portion cannot be recognized. On this account, after the three-dimensional position and the posture of the rigid body portion are recognized by comparing the three-dimensional measurement data of the rigid body portion with the three-dimensional CAD data, the workpiece including the rigid body portion is picked by gripping the rigid body portion.

However, in a case where a plurality of workpieces is present (loaded in bulk) in a state where soft body portions of the workpieces cross each other, a first workpiece including a rigid body portion the three-dimensional position and the posture of which are recognized sometimes overlaps a second workpiece in a state where the soft body portion of the second workpiece crosses over the soft body portion of the first workpiece. In such a case, when the first workpiece including the rigid body portion is lifted by gripping, by the robotic hand, the rigid body portion the three-dimensional position and the posture of which are recognized, the second workpiece the soft body portion of which is put on the soft body portion of the first workpiece in a crossing manner is also lifted together. On this account, a plurality of workpieces is lifted by the robotic hand at the same time, thereby resulting in that an expected weight (allowable weight) for the workpiece gripped by the robotic hand is exceeded. As a result, a gripped state of the first workpiece by the robotic hand cannot be maintained, so that the first workpiece thus gripped and the second workpiece lifted together might drop. On this account, there has been demanded a method for identifying an uppermost workpiece placed at an uppermost position among a plurality of workpieces in a case where the workpieces are present (loaded in bulk) in a workpiece storage area in a state where soft body portions of a plurality of workpieces cross each other.

The present disclosure is accomplished in view of such a current situation, and an object of the present disclosure is to provide a workpiece identification method by which an uppermost workpiece placed at an uppermost position among a plurality of workpieces can be identified in a case where the workpieces are present (loaded in bulk) in a workpiece storage area in a state where soft body portions of a plurality of workpieces cross each other.

One aspect of the present disclosure is a workpiece identification method including: capturing an image of a workpiece storage area in which a plurality of workpieces is to be placed, the workpieces each including a soft body portion having a free line shape; determining whether or not the workpieces are present in the workpiece storage area based on the image acquired by the image capturing; when the workpieces are determined to be present, determining, based on the image, whether or not a crossing part is present in the workpiece storage area, the crossing part being a part where the soft body portions of a plurality of workpieces cross each other in an overlapping manner; when the crossing part is determined to be present, determining, based on the image, an uppermost soft body portion placed at an uppermost position among the soft body portions crossing each other; and determining that a workpiece including the uppermost soft body portion thus determined is an uppermost workpiece placed at an uppermost position. The workpiece identification method includes: when the uppermost soft body portion is not determinable based on the image, considering a procedure for creating the uppermost soft body portion by moving one or more workpieces; and moving the one or more workpieces in accordance with the procedure found by the consideration so that the uppermost soft body portion is created.

In the workpiece identification method, a workpiece including a soft body portion having a free line shape (a free shape forming a linear shape) is targeted for identification. With the workpiece identification method, an uppermost workpiece placed at an uppermost position among a plurality of workpieces can be identified in a case where the workpieces are present (loaded in bulk) in a workpiece storage area in a state where soft body portions of a plurality of workpieces cross each other.

In the meantime, in the workpiece identification method, when the crossing part in which the soft body portions of the workpieces cross each other in an overlapping manner is determined to be present, the uppermost soft body portion placed at the uppermost position among the soft body portions crossing each other is determined based on the image acquired by image capturing. Then, the workpiece including the uppermost soft body portion thus determined is determined as the uppermost workpiece placed at the uppermost position. However, in some cases, the uppermost soft body portion cannot be determined based on the image thus acquired by the image capturing.

More specifically, an example of such cases is as follows. That is, three soft body portions (referred to as a first soft body portion, a second soft body portion, and a third soft body portion) included in three workpieces (referred to as a first workpiece, a second workpiece, and a third workpiece) cross each other, and it is difficult to determine the uppermost soft body portion based on the order of the soft body portions in the up-down direction in each crossing part. For example, the first soft body portion and the second soft body portion cross each other in a state where the second soft body portion is placed above the first soft body portion, the second soft body portion and the third soft body portion cross each other in a state where the third soft body portion is placed above the second soft body portion, and the first soft body portion and the third soft body portion cross each other in a state where the first soft body portion is placed above the third soft body portion. In such a case, no soft body portion is placed above the other two soft body portions among the three soft body portions. Accordingly, it is difficult to determine the uppermost soft body portion.

In this respect, in the above workpiece identification method, in a case where the uppermost soft body portion cannot be determined based on the image acquired by image capturing, a procedure for "creating the uppermost soft body portion by moving one or more workpieces among the workpieces present in the workpiece storage area" is considered. Then, the workpieces are moved in accordance with the procedure found (derived) by the consideration so that the uppermost soft body portion is created.

More specifically, in the case of the above example, for example, the second workpiece is moved (the second workpiece is separated from the first workpiece) so that a state where the second soft body portion is put on the first soft body portion is changed to a state where the second soft body portion does not overlap the first body portion. Hereby, such a state is created that "the second soft body portion and the third soft body portion cross each other in a state where the third soft body portion is placed above the second soft body portion, the first soft body portion and the third soft body portion cross each other in a state where the first soft body portion is placed above the third soft body portion, and the first soft body portion and the second soft body portion do not cross each other." This allows the first soft body portion to become the uppermost soft body portion.

As such, in the workpiece identification method, the procedure for creating the uppermost soft body portion is considered, and the uppermost soft body portion is created by moving the workpieces in accordance with the procedure thus found (derived) by the consideration. Hereby, the uppermost soft body portion becomes determinable.

The workpiece identification method is, for example, a workpiece identification method including: a first image capturing step of capturing an image of a workpiece storage area in which a plurality of workpieces is to be placed, the workpieces each including a soft body portion having a free line shape; a workpiece presence determination step of determining whether or not the workpieces are present in the workpiece storage area based on the image acquired by the image capturing in the first image capturing step; a crossing part presence determination step of, when the workpieces are determined to be present in the workpiece presence determination step, determining, based on the image, whether or not a crossing part is present in the workpiece storage area, the crossing part being a part where the soft body portions of a plurality of workpieces cross each other in an overlapping manner; an uppermost soft body portion determination step of, when the crossing part is determined to be present in the crossing part presence determination step, determining, based on the image, an uppermost soft body portion placed at an uppermost position among the soft body portions crossing each other; and an uppermost workpiece determination step of determining that a workpiece including the uppermost soft body portion thus determined in the uppermost soft body portion determination step is an uppermost workpiece placed at an uppermost position. The workpiece identification method includes: a creation procedure consideration step of, when the uppermost soft body portion is not determinable in the uppermost soft body portion determination step, considering a procedure for creating the uppermost soft body portion by moving one or more workpieces; and a moving step of moving the one or more workpieces in accordance with the procedure found (derived) in the creation procedure consideration step so that the uppermost soft body portion is created.

Further, the above workpiece identification method may include: capturing again an image of the workpiece storage area after the one or more workpieces are moved in accordance with the procedure; determining again whether or not the crossing part is present in the workpiece storage area based on the image acquired again by the image capturing; and when the crossing part is determined to be present, determining again the uppermost soft body portion based on the image thus acquired again.

In the workpiece identification method, an image of the workpiece storage area is captured again after the workpieces are moved in accordance with the procedure for creating the uppermost soft body portion. After that, the uppermost soft body portion is determined again based on the image thus acquired again by this image capturing. Hereby, even in a case where the uppermost soft body portion is not determinable before the workpieces are moved, the uppermost soft body portion becomes determinable after the workpieces are moved.

The workpiece identification method is, for example, the aforementioned workpiece identification method and includes a second image capturing step of, after the moving step, capturing again an image of the workpiece storage area. In the workpiece identification method, after the second image capturing step, whether or not the crossing part is present in the workpiece storage area is determined, in the crossing part presence determination step, based on the image acquired again by the image capturing in the second image capturing step. When the crossing part is determined to be present, the uppermost soft body portion is then determined, in the uppermost soft body portion determination step, based on the image thus acquired again.

Further, any of the above workpiece identification methods may include: when the procedure for creating the uppermost soft body portion is not found by the consideration, performing an operation to change at random a positional relationship between the workpieces present in the workpiece storage area; capturing again an image of the workpiece storage area after the operation; determining again whether or not the crossing part is present in the workpiece storage area based on the image acquired again by the image capturing; and when the crossing part is determined to be present, determining again the uppermost soft body portion based on the image thus acquired again.

In the workpiece identification method, when the procedure for creating the uppermost soft body portion cannot be found (derived) as a result of consideration for the procedure for creating the uppermost soft body portion, an operation to change at random the positional relationship between the workpieces present in the workpiece storage area is performed. More specifically, the positional relationship between the workpieces is changed at random by moving at random the workpieces present in the workpiece storage area, for example. By performing such an operation, the uppermost soft body portion may be created. Alternatively, the procedure for creating the uppermost soft body portion can be findable (derivable).

In the workpiece identification method, after the above operation is performed, an image of the workpiece storage area is captured again, and the uppermost soft body portion is determined again based on the image thus acquired again by this image capturing. Hereby, even in a case where the uppermost soft body portion cannot be determined before the above operation is performed, the uppermost soft body portion can become determinable after the above operation is performed. Alternatively, after the above operation is performed, the procedure for creating the uppermost soft body portion can become findable (derivable). In a case where the procedure for creating the uppermost soft body portion becomes findable (derivable), the uppermost soft body portion is created by moving the workpieces in accordance with the procedure thus found, so that the uppermost soft body portion becomes determinable.

The workpiece identification method is, for example, the aforementioned workpiece identification method and includes a positional relationship changing step of, when the procedure for creating the uppermost soft body portion cannot be found (derived) in the creation procedure consideration step, performing an operation to change at random a positional relationship between the workpieces present in the workpiece storage area. After the positional relationship changing step, an image of the workpiece storage area is captured again in the second image capturing step. After that, in the crossing part presence determination step, whether or not the crossing part is present in the workpiece storage area is determined based on the image acquired again by the image capturing in the second image capturing step. When the crossing part is determined to be present, the uppermost soft body portion is then determined, in the uppermost soft body portion determination step, based on the image thus acquired again.

Further, in any of the above workpiece identification methods, the workpieces may be workpieces each constituted by the soft body portion and a rigid body portion. After the uppermost soft body portion is determined but before the uppermost workpiece is determined, whether or not the soft body portion and the rigid body portion are recognizable may be determined based on the image in terms of the workpiece including the uppermost soft body portion thus determined. When the soft body portion and the rigid body portion are determined to be recognizable, the workpiece including the uppermost soft body portion may be determined as the uppermost workpiece.

In the workpiece identification method, a workpiece constituted by a rigid body portion and a soft body portion having a free line shape (a free shape forming a linear shape) is targeted for identification. In the workpiece identification method, after the uppermost soft body portion is determined, whether or not the soft body portion and the rigid body portion are recognizable is determined in terms of the workpiece including the uppermost soft body portion thus determined. Here, the case where the soft body portion and the rigid body portion are recognizable in terms of the workpiece including the uppermost soft body portion is, for example, a case where the whole soft body portion and the whole rigid body portion appear in the acquired image, and the whole soft body portion and the whole rigid body portion are observable in the acquired image. As such, by recognizing the soft body portion and the rigid body portion in the workpiece including the uppermost soft body portion thus determined, it is possible to confirm the workpiece as a workpiece constituted by the rigid body portion and the soft body portion (a workpiece in which the rigid body portion is integrated with the soft body portion). This makes it possible to more appropriately identify the uppermost workpiece.

The workpiece identification method is, for example, any of the aforementioned workpiece identification methods. The workpieces are workpieces each constituted by the soft body portion and a rigid body portion. The workpiece identification method includes a workpiece recognizability determination step of, after the uppermost soft body portion determination step but before the uppermost workpiece determination step, determining whether or not the soft body portion and the rigid body portion are recognizable based on the image in terms of the workpiece including the uppermost soft body portion thus determined in the uppermost soft body portion determination step. When the soft body portion and the rigid body portion are determined to be recognizable in the workpiece recognizability determination step, the workpiece including the uppermost soft body portion is determined as the uppermost workpiece in the uppermost workpiece determination step.

Further, the above workpiece identification method may include: when the soft body portion and the rigid body portion are determined to be not recognizable, capturing again an image of the workpiece storage area by changing an angle to capture the image of the workpiece storage area; determining again whether or not the crossing part is present in the workpiece storage area based on the image acquired again by the image capturing; when the crossing part is determined to be present, determining again the uppermost soft body portion based on the image thus acquired again; and determining again whether or not the soft body portion and the rigid body portion are recognizable based on the image thus acquired again in terms of the workpiece including the uppermost soft body portion thus determined again.

In the workpiece identification method, when the soft body portion and the rigid body portion are determined to be not recognizable based on the acquired image in terms of the workpiece including the uppermost soft body portion, an image of the workpiece storage area is captured again from an angle different from an angle (an angle to capture the image of the workpiece storage area) at which the image as grounds for the determination (used for the determination) is captured. Then, the uppermost soft body portion is determined again based on the image acquired again by this image capturing, and in terms of the workpiece including the uppermost soft body portion thus determined again, whether the soft body portion and the rigid body portion are recognizable or not is determined again. Hereby, even in a case where the soft body portion and the rigid body portion cannot be recognized based on the image acquired previously in terms of the workpiece including the uppermost soft body portion, it is possible to recognize the soft body portion and the rigid body portion based on the image thus acquired again in terms of the workpiece including the uppermost soft body portion.

The above workpiece identification method is, for example, the aforementioned workpiece identification method and includes a third image capturing step of, when the soft body portion and the rigid body portion are determined to be not recognizable in the workpiece recognizability determination step, capturing again an image of the workpiece storage area by changing an angle to capture the image of the workpiece storage area. In the workpiece identification method, after the third image capturing step, whether or not the crossing part is present in the workpiece storage area is determined, in the crossing part presence determination step, based on the image acquired again by the image capturing in the third image capturing step. When the crossing part is determined to be present, the uppermost soft body portion is then determined, in the uppermost soft body portion determination step, based on the image thus acquired again. After that, in the workpiece recognizability determination step, whether or not the soft body portion and the rigid body portion are recognizable is determined again based on the image thus acquired again by the image capturing in the third image capturing step, in terms of the workpiece including the uppermost soft body portion thus determined in the uppermost soft body portion determination step.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 8 illustrates another example of the image acquired by image capturing.

DETAILED DESCRIPTION OF EMBODIMENTS

Figure 1:
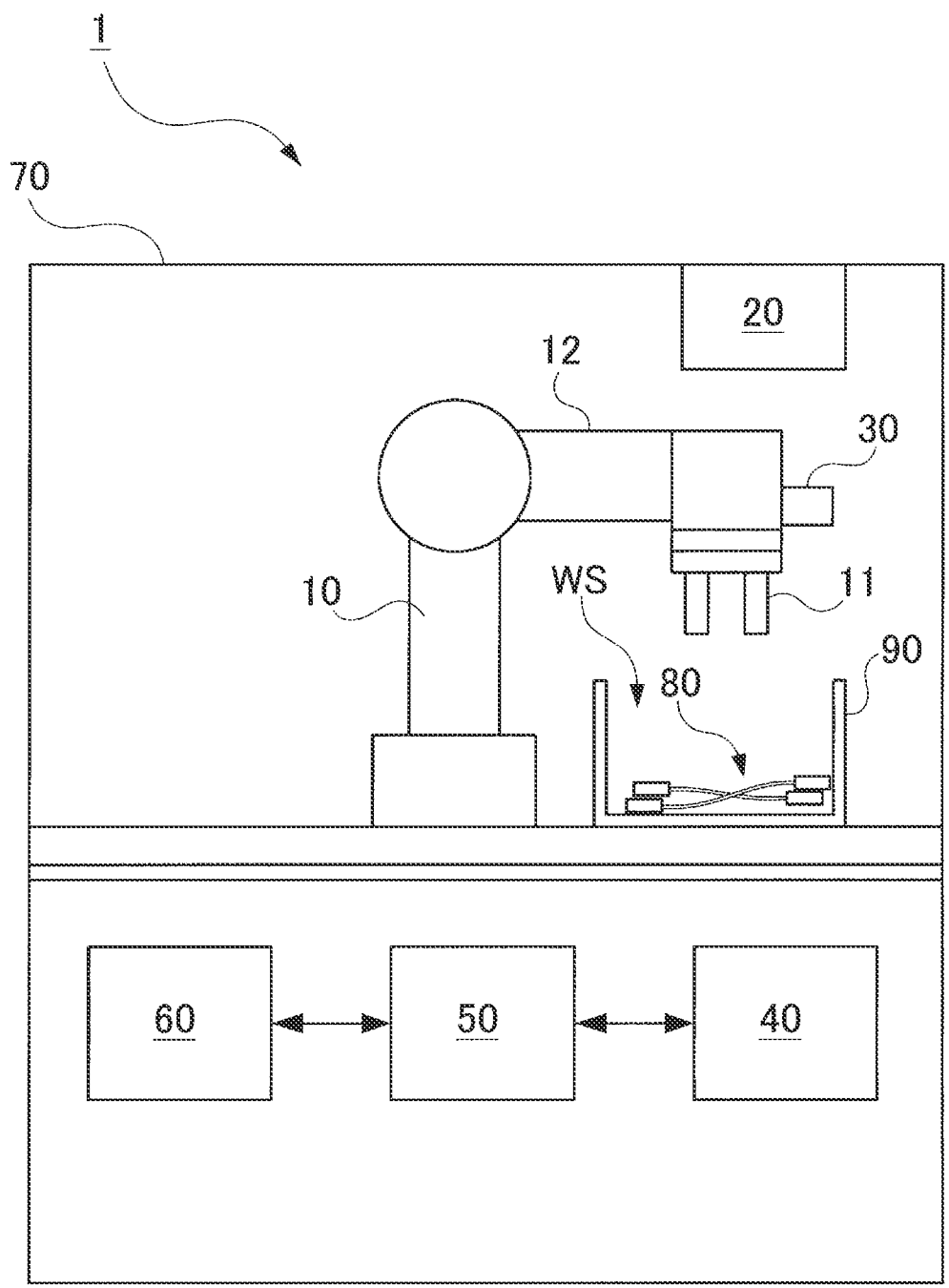
FIG. 1 is a configuration diagram of a gripping device according to an embodiment.

Next will be described an embodiment of the present disclosure with reference to the drawings. FIG. 1 is a configuration diagram of a gripping device 1 according to the embodiment. As illustrated in FIG. 1, the gripping device 1 includes a gripping robot 10, a 3D vision sensor 20, a 2D vision sensor 30, an image analyzing portion 40, a robot controller 50, a 3D vision controller 60, and a frame 70.

Figure 2:
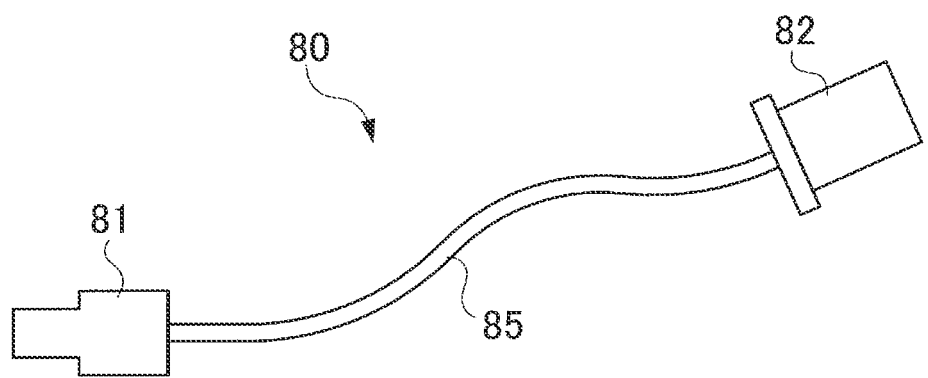
FIG. 2 is a plan view of a workpiece.

The gripping device 1 is a device for taking out one or more workpieces 80 from a workpiece storage box 90 by sequentially gripping the workpieces 80 one by one. The workpieces 80 are placed (loaded in bulk) inside the workpiece storage box 90 as a workpiece storage area WS. Note that the workpiece 80 of the present embodiment includes a soft body portion (a cable 85) having a free line shape (in other words, an amorphous line shape). More specifically, the workpiece 80 of the present embodiment is a wire harness constituted by connectors 81, 82 as rigid body portions and a cable 85 as a soft body portion having a free line shape, as illustrated in FIG. 2.

As illustrated in FIG. 1, the gripping robot 10 includes a gripper 11 configured to grip the workpiece 80 and an articulated arm portion 12 connected to the gripper 11. The gripping robot 10 grips, by the gripper 11, the rigid body portion (the connector 81 or the connector 82) of the workpiece 80 placed in the workpiece storage area WS (inside the workpiece storage box 90) and takes out the gripped workpiece 80 from the workpiece storage area WS (the inside of the workpiece storage box 90). Note that, in the present embodiment, the articulated arm portion 12 is constituted by an articulated robot (YASKAWA GP-7) made by Yaskawa Electric Corporation.

The 3D vision sensor 20 is a well-known 3D (three-dimensional) vision sensor and is attached to the ceiling of the frame 70. The 3D vision sensor 20 generates three-dimensional measurement data (three-dimensional image data) of the workpiece 80 placed inside the workpiece storage box 90 as the workpiece storage area WS. Note that, in the present embodiment, the 3D vision sensor 20 is constituted by a machine vision system (RV500) made by Canon Inc.

The 2D vision sensor 30 is a well-known 2D (two-dimensional) vision sensor and is attached to a distal end portion of the gripping robot 10. The 2D vision sensor 30 captures an image of the inside of the workpiece storage box 90 as the workpiece storage area WS and generates a two-dimensional image VD (two-dimensional image data, see FIGS. 4, 5, and 8) of the inside of the workpiece storage box 90. Note that the workpiece storage box 90 is a rectangular box opening upward (the near side on the plane of paper in FIGS. 4, 5, and 8). Accordingly, the 2D vision sensor 30 captures an image of the inside of the workpiece storage box 90 from the upper side of the workpiece storage box 90. Note that two-dimensional images VD in FIGS. 4, 5, and 8 are two-dimensional images VD generated such that the 2D vision sensor 30 captures an image of the inside of the workpiece storage box 90 in the vertical direction from right above the opening of the workpiece storage box 90.

The image analyzing portion 40 is a computer constituting AI (artificial intelligence) or the like and is configured to acquire a two-dimensional image VD (two-dimensional image data) of the workpieces 80 and analyze the two-dimensional image VD. The two-dimensional image VD is generated by the 2D vision sensor 30. More specifically, the image analyzing portion 40, for example, acquires a two-dimensional image VD (two-dimensional image data) generated by the 2D vision sensor 30 and determines whether or not the workpieces 80 are present inside the workpiece storage box 90 as the workpiece storage area WS, based on the two-dimensional image VD (see FIGS. 4 and 5) thus acquired.

Further, when the image analyzing portion 40 determines that the workpieces 80 are present in the workpiece storage box 90, the image analyzing portion 40 determines, based on the acquired two-dimensional image VD, whether or not a crossing part CP (see FIGS. 4, 5, and 8) is present in the workpiece storage area WS (inside the workpiece storage box 90), the crossing part CP being a part where the cables 85 (the soft body portions) of a plurality of workpieces 80 cross each other in an overlapping manner. Further, when the image analyzing portion 40 determines that the crossing part CP is present, the image analyzing portion 40 determines, based on the acquired two-dimensional image VD, an uppermost cable 85T (an uppermost soft body portion) placed at an uppermost position (the nearest side on the plane of paper in FIGS. 4, 5, and 8) among the cables 85 (the soft body portions) crossing each other.

Figure 4:
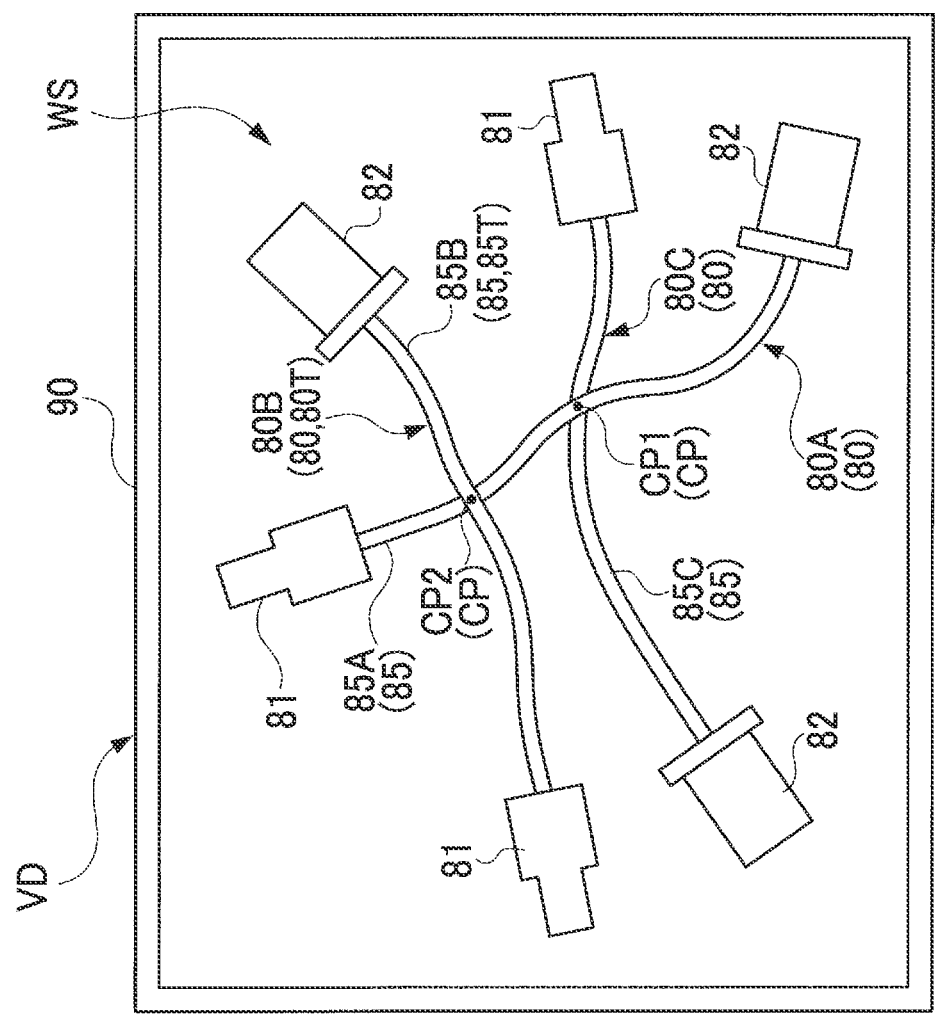
FIG. 4 illustrates an example of an image acquired by image capturing.
Figure 5:
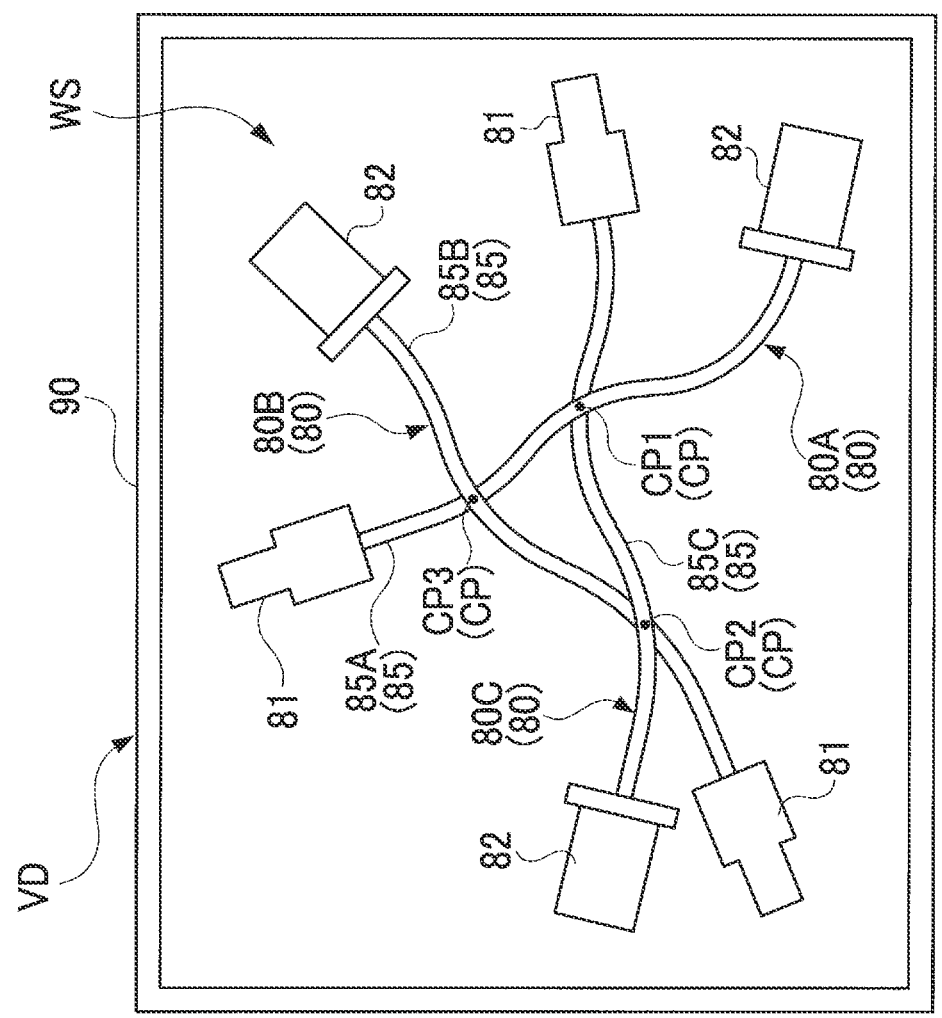
FIG. 5 illustrates another example of the image acquired by image capturing.

In the example illustrated in FIG. 4, the crossing part CP (a first crossing part CP1) and the crossing part CP (a second crossing part CP2) are present in the workpiece storage area WS (inside the workpiece storage box 90) where three workpieces 80 (a first workpiece 80A, a second workpiece 80B, and a third workpiece 80C) are present. In the crossing part CP (the first crossing part CP1), in a state where the cable 85 (referred to as a first cable 85A) of the first workpiece 80A is placed above the cable 85 (referred to as a third cable 85C) of the third workpiece 80C, the first cable 85A crosses the third cable 85C. In the crossing part CP (the second crossing part CP2), in a state where the cable 85 (referred to as a second cable 85B) of the second workpiece 80B is placed above the first cable 85A, the first cable 85A crosses the second cable 85B. In this case, the second cable 85B (the soft body portion) of the second workpiece 80B can be determined as the uppermost cable 85T (the uppermost soft body portion).

Further, in the example illustrated in FIG. 8, the crossing part CP (the first crossing part CP1) and the crossing part CP (the second crossing part CP2) are present in the workpiece storage area WS (inside the workpiece storage box 90) where three workpieces 80 (the first workpiece 80A, the second workpiece 80B, and the third workpiece 80C) are present. In the crossing part CP (the first crossing part CP1), in a state where the first cable 85A of the first workpiece 80A is placed above the third cable 85C of the third workpiece 80C, the first cable 85A crosses the third cable 85C. In the crossing part CP (the second crossing part CP2), in a state where the third cable 85C is placed above the second cable 85B of the second workpiece 80B, the third cable 85C crosses the second cable 85B. In this case, the first cable 85A (the soft body portion) of the first workpiece 80A can be determined as the uppermost cable 85T (the uppermost soft body portion).

Note that images of a plurality of arrangement patterns where the workpieces 80 are arranged at various positions in the workpiece storage area WS (inside the workpiece storage box 90) and combination data between each of the arrangement patterns and its corresponding uppermost cable 85T (the uppermost soft body portion) have been stored in (presented to) the image analyzing portion 40 in advance for learning. The image analyzing portion 40 configured as such can perform a process of determining (identifying) the uppermost cable 85T (the uppermost soft body portion) from among the cables 85 (the soft body portions) crossing each other based on the acquired two-dimensional image VD (see FIGS. 5 and 8).

Further, the image analyzing portion 40 determines, based on the acquired two-dimensional image VD, whether the cable 85 as the soft body portion and the connectors 81, 82 as the rigid body portions are recognizable or not in terms of the workpiece 80 (the first workpiece 80A in the example illustrated in FIG. 8) including the uppermost cable 85T thus determined. More specifically, in a case where the whole cable 85 (the soft body portion) and the whole connectors 81, 82 (the rigid body portions) appear in the acquired two-dimensional image VD in terms of the workpiece 80 including the uppermost cable 85T, and therefore, the whole cable 85 (the soft body portion) and the whole connectors 81, 82 (the rigid body portions) of the workpiece 80 including the uppermost cable 85T are observable in the acquired two-dimensional image VD, for example, the image analyzing portion 40 determines that the cable 85 (the uppermost cable 85T) as the soft body portion and the connectors 81, 82 as the rigid body portions are recognizable in terms of the workpiece 80 including the uppermost cable 85T thus determined (see FIG. 6).

As such, when the cable 85 (the soft body portion) and the connectors 81, 82 (the rigid body portions) are recognized in the workpiece 80 including the uppermost cable 85T (the uppermost soft body portion) thus determined, it is possible to confirm the workpiece 80 as a wire harness constituted by the connectors 81, 82 as the rigid body portions and the cable 85 as the soft body portion (in other words, a wire harness in which the connectors 81, 82 as the rigid body portions are integrated with the cable 85 as the soft body portion).

In the meantime, in a case where the image analyzing portion 40 determines, based on the acquired two-dimensional image VD, that the cable 85 as the soft body portion and the connectors 81, 82 as the rigid body portions are not recognizable in terms of the workpiece 80 including the uppermost cable 85T, the image analyzing portion 40 causes the 2D vision sensor 30 to capture again an image of the workpiece storage area WS from an angle different from an angle (an angle to capture the image of the workpiece storage area WS) at which the two-dimensional image VD as grounds for the determination (used for the determination) is captured. More specifically, in a case where the two-dimensional image VD as grounds for the determination is a two-dimensional image VD generated by capturing an image of the inside of the workpiece storage box 90 in the vertical direction from right above the opening of the workpiece storage box 90, for example, the 2D vision sensor 30 is turned to a direction diagonal to the vertical direction from above the opening of the workpiece storage box 90 (the angle to capture an image is changed), and an image of the workpiece storage area WS is captured again.

Further, the image analyzing portion 40 determines the uppermost cable 85T again based on a two-dimensional image VD acquired again by this image capturing, and the image analyzing portion 40 determines again whether the cable 85 (the soft body portion) and the connectors 81, 82 (the rigid body portions) are recognizable or not in terms of the workpiece 80 including the uppermost cable 85T thus determined. Hereby, even in a case where the cable 85 (the soft body portion) and the connectors 81, 82 (the rigid body portions) cannot be recognized, based on the two-dimensional image VD acquired previously, in terms of the workpiece 80 including the uppermost cable 85T, it is possible to recognize, based on the two-dimensional image VD acquired again, the cable 85 (the soft body portion) and the connectors 81, 82 (the rigid body portions) in terms of the workpiece 80 including the uppermost cable 85T.

Further, when the image analyzing portion 40 determines that the cable 85 (the uppermost cable 85T) as the soft body portion and the connectors 81, 82 as the rigid body portions are recognizable, the image analyzing portion 40 determines the workpiece 80 including the uppermost cable 85T as an uppermost workpiece 80T. Note that, in the present embodiment, Vision Pro ViDi made by COGNEX corporation is used as software of the image analyzing portion 40.

The 3D vision controller 60 is a device configured to acquire and process three-dimensional measurement data (three-dimensional image data) generated by the 3D vision sensor 20. In the 3D vision controller 60, pieces of three-dimensional CAD data of the connectors 81, 82 (the rigid body portions) of the workpiece 80 are stored in advance. For example, the 3D vision controller 60 acquires three-dimensional measurement data (three-dimensional image data) of the workpiece 80 placed in the workpiece storage area WS (inside the workpiece storage box 90), the three-dimensional measurement data being generated by the 3D vision sensor 20. The 3D vision controller 60 then compares three-dimensional measurement data of a rigid body portion (the connector 81 or the connector 82) selected from the acquired three-dimensional measurement data (three-dimensional image data), with the three-dimensional CAD data of the rigid body portion (the connector 81 or the connector 82). Hereby, the 3D vision controller 60 recognizes (detects) a three-dimensional position and a posture of the rigid body portion (the connector 81 or the connector 82) of the workpiece 80.

The robot controller 50 is a device configured to control movement of the gripping robot 10. The robot controller 50 controls movement of the gripping robot 10 based on process results by the image analyzing portion 40 or process results by the 3D vision controller 60. More specifically, for example, the robot controller 50 controls operations of the articulated arm portion 12 and the gripper 11 of the gripping robot 10 based on the three-dimensional position and the posture of the rigid body portion (the connector 81 or the connector 82) of the workpiece 80, the three-dimensional position and the posture being recognized (detected) by the 3D vision controller 60. Hereby, the robot controller 50 performs a control such that the rigid body portion (the connector 81 or the connector 82) of the workpiece 80 is gripped by the gripper 11 and the workpiece 80 is taken out from the workpiece storage area WS (the inside of the workpiece storage box 90).

In the meantime, as described above, in a case where the image analyzing portion 40 determines that the crossing part CP where the cables 85 (the soft body portions) of the workpieces 80 cross each other in an overlapping manner is present, the image analyzing portion 40 performs, based on the two-dimensional image VD acquired by image capturing, a process of determining the uppermost cable 85T (the uppermost soft body portion) placed at the uppermost position among the cables 85 (the soft body portions) crossing each other. However, in some cases, the uppermost cable 85T (the uppermost soft body portion) is not determinable based on the two-dimensional image VD acquired by image capturing.

More specifically, like the example illustrated in FIG. 5, there is a case where the crossing part CP (referred to as a third crossing part CP3), the crossing part CP (the second crossing part CP2), and the crossing part (the first crossing part CP1) are present, for example. In the crossing part CP (the third crossing part CP3), in a state where the second cable 85B (a second soft body portion) of the second workpiece 80B is placed above the first cable 85A (a first soft body portion) of the first workpiece 80A, the first cable 85A crosses the second cable 85B. In the crossing part CP (the second crossing part CP2), in a state where the third cable 85C (a third soft body portion) of the third workpiece 80C is placed above the second cable 85B, the second cable 85B crosses the third cable 85C. In the crossing part CP (the first crossing part CP1), in a state where the first cable 85A is placed above the third cable 85C, the first cable 85A crosses the third cable 85C. In such a case, the uppermost cable 85T cannot be determined because no cable 85 is placed above the other two cables 85 (that is, no uppermost cable 85T is present) among three cables 85 (the first cable 85A, the second cable 85B, and the third cable 85C).

In this respect, in a case where the image analyzing portion 40 cannot determine the uppermost cable 85T (the uppermost soft body portion) based on the two-dimensional image VD acquired by image capturing, the image analyzing portion 40 considers a procedure for "creating the uppermost cable 85T (the uppermost soft body portion) by moving one or more workpieces 80 among the workpieces 80 present in the workpiece storage area WS." Further, in order to create the uppermost cable 85T (the uppermost soft body portion), the image analyzing portion 40 transmits, to the robot controller 50, a signal to move the workpieces 80 in accordance with the procedure found (derived) by the consideration.

The robot controller 50 receiving this signal transmits, to the 3D vision controller 60, a signal to recognize (detect) three-dimensional positions and postures of the rigid body portions (the connectors 81 or the connectors 82) of the workpieces 80 placed in the workpiece storage area WS (inside the workpiece storage box 90). The 3D vision controller 60 receiving this signal causes the 3D vision sensor 20 to generate pieces of three-dimensional measurement data (three-dimensional image data) of the workpieces 80 placed in the workpiece storage area WS (inside the workpiece storage box 90).

Further, the 3D vision controller 60 acquires the pieces of three-dimensional measurement data (three-dimensional image data) of the workpieces 80 placed in the workpiece storage area WS, the pieces of three-dimensional measurement data being generated by the 3D vision sensor 20. Then, the 3D vision controller 60 selects the three-dimensional measurement data of the rigid body portion (the connector 81 or the connector 82) of the workpiece 80 to be moved from among the pieces of three-dimensional measurement data (three-dimensional image data) thus acquired. Furthermore, the 3D vision controller 60 compares the selected three-dimensional measurement data of the rigid body portion (the connector 81 or the connector 82) with three-dimensional CAD data corresponding to the rigid body portion (the connector 81 or the connector 82), so that the 3D vision controller 60 recognizes (detects) a three-dimensional position and a posture of the rigid body portion (the connector 81 or the connector 82) of the workpiece 80 to be moved.

Further, the 3D vision controller 60 transmits, to the robot controller 50, a recognition (detection) result of the three-dimensional position and the posture of the rigid body portion (the connector 81 or the connector 82) of the workpiece 80 to be moved. After that, the robot controller 50 controls the operations of the articulated arm portion 12 and the gripper 11 of the gripping robot 10 based on the three-dimensional position and the posture of the rigid body portion (the connector 81 or the connector 82) of the workpiece 80, the three-dimensional position and the posture being recognized (detected) by the 3D vision controller 60. Hereby, the robot controller 50 causes the gripper 11 to grip the rigid body portion (the connector 81 or the connector 82) of the workpiece 80 to be moved and to move the workpiece 80 in accordance with the procedure received from the image analyzing portion 40.

More specifically, in the case of the example illustrated in FIG. 5, the image analyzing portion 40 finds that the first cable 85A becomes the uppermost cable 85T (the uppermost soft body portion) (e.g., the state illustrated in FIG. 8 is created) by moving the second workpiece 80B (separating the second workpiece 80B from the first workpiece 80A) so that the second workpiece 80B is brought into a state where the second cable 85B does not cross the first cable 85A from a state where the second cable 85B and the first cable 85A cross each other with the second cable 85B being placed above the first cable 85A, for example. Accordingly, the image analyzing portion 40 transmits, to the robot controller 50 as the procedure for creating the uppermost cable 85T (the uppermost soft body portion), "a procedure for making the first cable 85A recognizable as the uppermost cable 85T by moving the second workpiece 80B (separating the second workpiece 80B from the first workpiece 80A) so that the second cable 85B does not cross the first cable 85A." The robot controller 50 receiving this signal transmits, to the 3D vision controller 60, a signal to recognize (detect) three-dimensional positions and postures of the rigid body portions (the connectors 81 or the connectors 82) of the workpieces 80 placed in the workpiece storage area WS (inside the workpiece storage box 90).

The 3D vision controller 60 receiving this signal causes the 3D vision sensor 20 to generate pieces of three-dimensional measurement data (three-dimensional image data) of the workpieces 80 placed in the workpiece storage area WS (inside the workpiece storage box 90). Further, the 3D vision controller 60 acquires the pieces of three-dimensional measurement data of the workpieces 80 placed in the workpiece storage area WS, the pieces of three-dimensional measurement data being generated by the 3D vision sensor 20. Then, the 3D vision controller 60 selects three-dimensional measurement data of the rigid body portion (e.g., the connector 82) of the second workpiece 80B to be moved from the pieces of three-dimensional measurement data thus acquired. Furthermore, the 3D vision controller 60 compares the selected three-dimensional measurement data of the rigid body portion (e.g., the connector 82) with three-dimensional CAD data corresponding to the rigid body portion (e.g., the connector 82), so that the 3D vision controller 60 recognizes (detects) a three-dimensional position and a posture of the rigid body portion (e.g., the connector 82) of the second workpiece 80B to be moved.

Further, the 3D vision controller 60 transmits, to the robot controller 50, a recognition (detection) result of the three-dimensional position and the posture of the rigid body portion (e.g., the connector 82) of the second workpiece 80B to be moved. After that, the robot controller 50 controls the operations of the articulated arm portion 12 and the gripper 11 of the gripping robot 10 based on the three-dimensional position and the posture of the rigid body portion (e.g., the connector 82) of the second workpiece 80B, the three-dimensional position and the posture being recognized (detected) by the 3D vision controller 60. Hereby, the robot controller 50 causes the gripper 11 to grip the rigid body portion (e.g., the connector 82) of the second workpiece 80B and to move the second workpiece 80B in accordance with the procedure received from the image analyzing portion 40 (see FIGS. 6 and 7).

Figure 6:
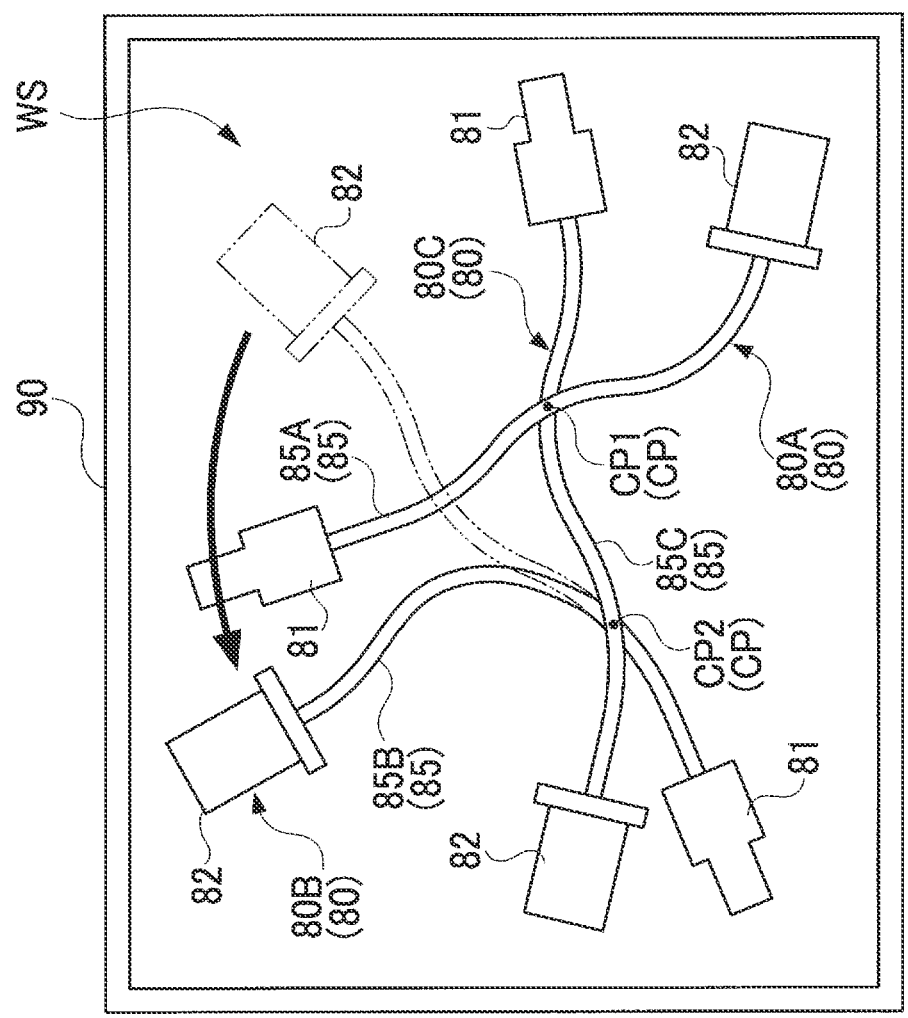
FIG. 6 is a view to describe the workpiece identification method according to the embodiment.
Figure 7:
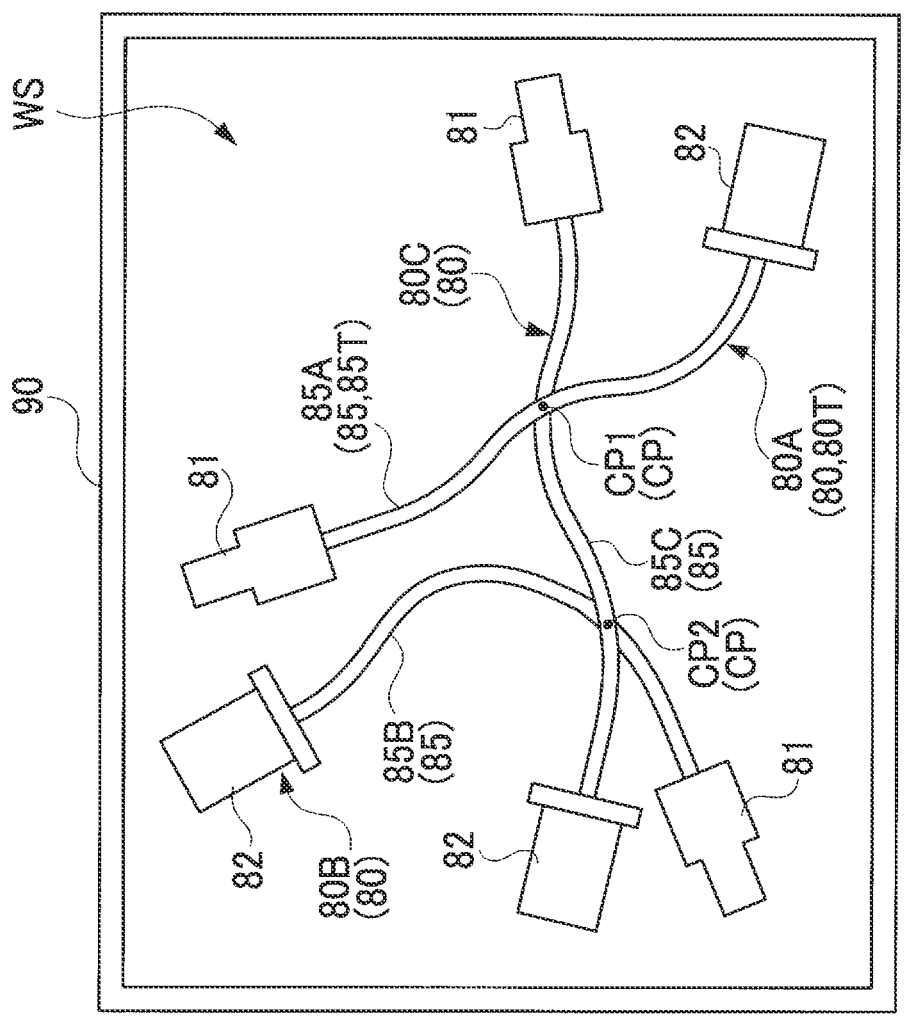
FIG. 7 is another view to describe the workpiece identification method according to the embodiment.

Note that FIG. 6 is a plan view (top view) of the workpiece storage area WS (the inside of the workpiece storage box 90). The second workpiece 80B before the second workpiece 80B is moved is indicated by an alternate long and two short dashes line, and the second workpiece 80B after the second workpiece 80B is moved is indicated by a continuous line. Further, FIG. 7 is a plan view (top view) of the workpiece storage area WS (the inside of the workpiece storage box 90) after the second workpiece 80B is moved. As indicated by an arrow in FIG. 6, the second workpiece 80B is moved in accordance with the procedure received from the image analyzing portion 40. Hereby, the state where the second cable 85B crosses the first cable 85A with the second cable 85B being placed above the first cable 85A (a state indicated by the alternate long and two short dashes line) can be changed to a state where the second cable 85B does not cross the first cable 85A (a state indicated by the continuous line). Consequently, as illustrated in FIG. 7, the first cable 85A can become the uppermost cable 85T (the uppermost soft body portion), so that the uppermost cable 85T (the uppermost soft body portion) becomes determinable.

Further, after the second workpiece 80B is moved in accordance with the considered procedure, the image analyzing portion 40 causes the 2D vision sensor 30 to capture again an image of the workpiece storage area WS (the inside of the workpiece storage box 90) and newly generate a two-dimensional image VD of the inside of the workpiece storage box 90 (see FIG. 8). After that, the image analyzing portion 40 acquires the two-dimensional image VD (see FIG. 8) thus newly generated and determines again the uppermost cable 85T (the uppermost soft body portion) based on the two-dimensional image VD. In the example illustrated in FIG. 8, the first cable 85A is determined as the uppermost cable 85T (the uppermost soft body portion).

Further, in a case where the image analyzing portion 40 cannot find the procedure for creating the uppermost cable 85T as a result of consideration for the procedure for creating the uppermost cable 85T (the uppermost soft body portion), the image analyzing portion 40 causes the gripping robot 10 to perform an operation to change at random a positional relationship between the workpieces 80 present in the workpiece storage area WS (inside the workpiece storage box 90). More specifically, in a case where the image analyzing portion 40 cannot find the procedure for creating the uppermost cable 85T, the image analyzing portion 40 transmits, to the robot controller 50, a signal to move at random the workpieces 80 present in the workpiece storage area WS. The robot controller 50 receiving this signal controls the operations of the articulated arm portion 12 and the gripper 11 of the gripping robot 10 so that the workpieces 80 present in the workpiece storage area WS (inside the workpiece storage box 90) are moved at random, for example.

More specifically, by swinging the workpiece storage box 90 by the gripping robot 10, for example, the workpieces 80 present in the workpiece storage area WS (inside the workpiece storage box 90) are moved at random. Alternatively, by mixing the inside of the workpiece storage box 90 by the gripping robot 10, the workpieces 80 present in the workpiece storage area WS (inside the workpiece storage box 90) are moved at random. Hereby, the positional relationship between the workpieces 80 present in the workpiece storage area WS (inside the workpiece storage box 90) is changed at random. By performing such an operation, the uppermost cable 85T (the uppermost soft body portion) can be created. Alternatively, a procedure for creating the uppermost cable 85T can be findable (derivable).

Further, after the above operation is performed, the image analyzing portion 40 causes the 2D vision sensor 30 to capture an image of the workpiece storage area WS again. Further, the image analyzing portion 40 determines the uppermost cable 85T (the uppermost soft body portion) again based on a two-dimensional image VD acquired again by this image capturing. Hereby, even in a case where the uppermost cable 85T cannot be determined before the above operation is performed, the uppermost cable 85T can become determinable after the above operation is performed. Alternatively, after the above operation is performed, the procedure for creating the uppermost cable 85T can be findable (derivable). In a case where the procedure for creating the uppermost cable 85T becomes findable (derivable), the uppermost cable 85T is created by moving the workpiece 80 in accordance with a procedure found as described above, so that the uppermost cable 85T becomes determinable.

Figure 3:
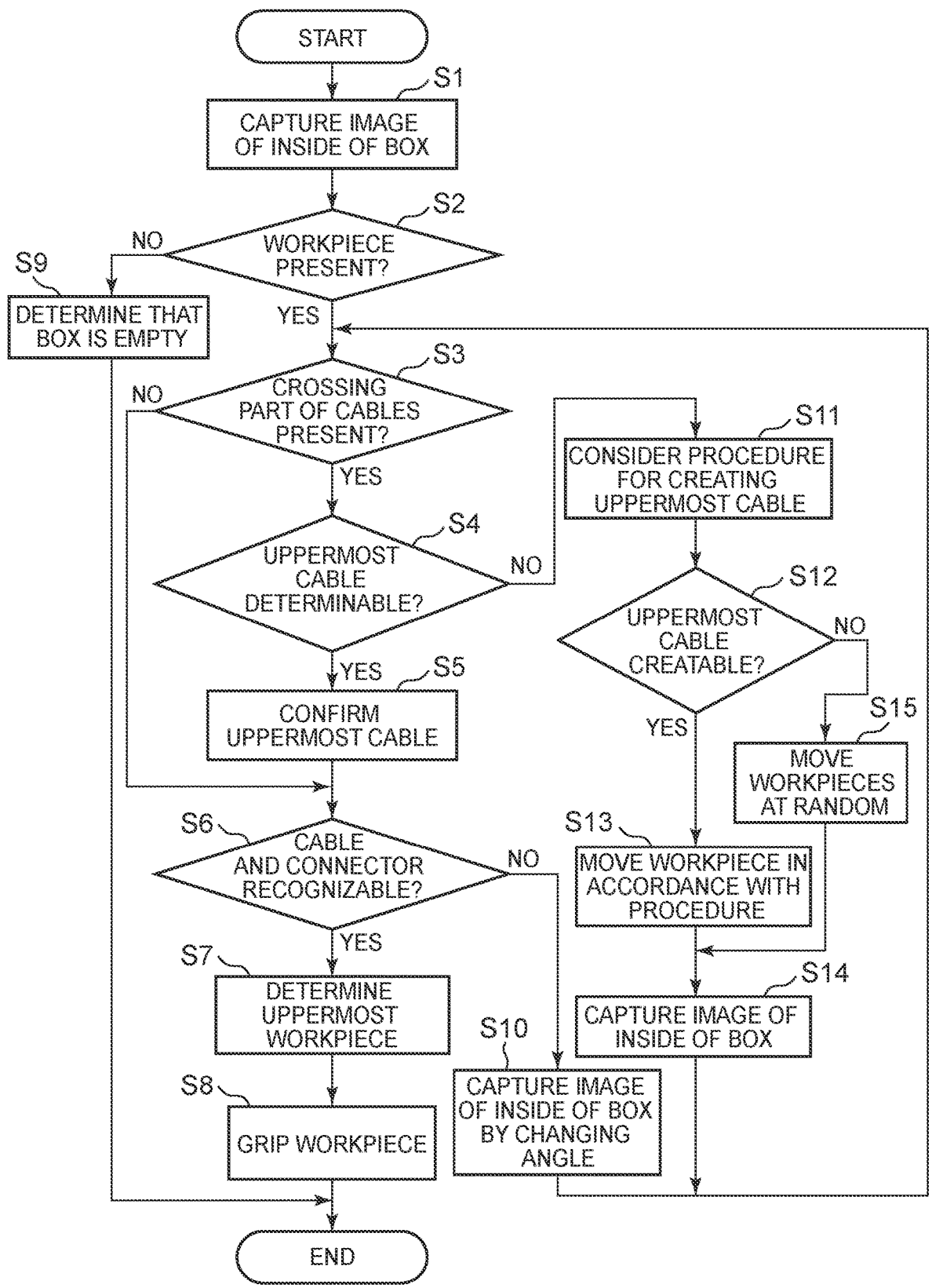
FIG. 3 is a flowchart illustrating a procedure of a workpiece identification method according to the embodiment.

Next will be described a workpiece identification method of the present embodiment. FIG. 3 is a flowchart illustrating a procedure of the workpiece identification method according to the embodiment. First, in step S1 (an image capturing step), the 2D vision sensor 30 captures an image of the inside of the workpiece storage box 90 as the workpiece storage area WS and generates a two-dimensional image VD (two-dimensional image data, see FIGS. 4 and 5) of the inside of the workpiece storage box 90. Subsequently, in step S2 (a workpiece presence determination step), the image analyzing portion 40 acquires the two-dimensional image VD (two-dimensional image data) generated by the 2D vision sensor 30 and determines whether or not the workpieces 80 are present inside the workpiece storage box 90 as the workpiece storage area WS, based on the two-dimensional image VD (see FIGS. 4 and 5) thus acquired.

In step S2, when the image analyzing portion 40 determines that the workpieces 80 are not present in the workpiece storage area WS (inside the workpiece storage box 90) (NO), the process proceeds to step S9. Here, the image analyzing portion 40 determines that the inside of the workpiece storage box 90 is empty and ends a series of workpiece identification processes. In the meantime, when the image analyzing portion 40 determines that the workpieces 80 are present in the workpiece storage area WS (inside the workpiece storage box 90), the process proceeds to step S3 (a crossing-part presence determination step). Here, the image analyzing portion 40 determines, based on the acquired two-dimensional image VD, whether or not the crossing part CP (see FIGS. 4 and 5) is present in the workpiece storage area WS (inside the workpiece storage box 90), the crossing part CP being a part where the cables 85 (the soft body portions) of the workpieces 80 cross each other in an overlapping manner.

When the image analyzing portion 40 determines, in step S3, that no crossing part CP is present (NO), the process proceeds to step S6 described below. In the meantime, when the image analyzing portion 40 determines, in step S3, that the crossing part CP is present (YES), the process proceeds to step S4 (an uppermost soft body portion determination step). Here, based on the acquired two-dimensional image VD (see FIGS. 4 and 5), the image analyzing portion 40 determines whether the uppermost cable 85T (the uppermost soft body portion) placed at the uppermost position (the nearest side on the plane of paper in FIGS. 4 and 5) among the cables 85 (the soft body portions) crossing each other is determinable or not.

Here, the following describes a case where the acquired two-dimensional image VD is a two-dimensional image VD illustrated in FIG. 4. In the two-dimensional image VD illustrated in FIG. 4, the second cable 85B (the soft body portion) of the second workpiece 80B can be determined as the uppermost cable 85T (the uppermost soft body portion). Accordingly, in step S4, the image analyzing portion 40 determines that the uppermost cable 85T (the uppermost soft body portion) is determinable (YES). Subsequently, in step S5 (an uppermost soft body portion determination step), the image analyzing portion 40 confirms the second cable 85B as the uppermost cable 85T (the uppermost soft body portion).

Subsequently, in step S6 (a workpiece recognizability determination step), based on the acquired two-dimensional image VD illustrated in FIG. 4, the image analyzing portion 40 determines whether the second cable 85B as the soft body portion and the connectors 81, 82 as the rigid body portions are recognizable or not in terms of the second workpiece 80B including the uppermost cable 85T (the second cable 85B) thus determined (confirmed).

More specifically, in a case where the whole second cable 85B (the soft body portion) and the whole connectors 81, 82 (the rigid body portions) appear in the acquired two-dimensional image VD illustrated in FIG. 4 in terms of the second workpiece 80B including the uppermost cable 85T (the second cable 85B), and the whole second cable 85B (the soft body portion) and the whole connectors 81, 82 (the rigid body portions) are observable in the acquired two-dimensional image VD illustrated in FIG. 4, for example, the image analyzing portion 40 determines that the second cable 85B (the uppermost cable 85T) as the soft body portion and the connectors 81, 82 as the rigid body portions are recognizable in terms of the second workpiece 80B including the uppermost cable 85T (YES).

Note that, in step S6, in a case where the image analyzing portion 40 determines that any of the cable 85 and the connectors 81, 82 is not recognizable in terms of the workpiece 80 including the uppermost cable 85T (NO), the process proceeds to step S10 (a third image capturing step). Here, the image analyzing portion 40 causes the 2D vision sensor 30 to capture again an image of the workpiece storage area WS from an angle different from an angle (an angle to capture the image of the workpiece storage area WS) at which the two-dimensional image VD as grounds for the determination is captured. After that, the process returns to step S3, and the image analyzing portion 40 determines, based on a two-dimensional image VD acquired again by this image capturing, whether or not the crossing part CP is present in the workpiece storage area WS, the crossing part CP being a part where the cables 85 (the soft body portions) of the workpieces 80 cross each other in an overlapping manner.

When the image analyzing portion 40 determines, in step S6, that the cable 85 and the connectors 81, 82 are recognizable in terms of the workpiece 80 including the uppermost cable 85T (YES), the image analyzing portion 40 determines the workpiece 80 including the uppermost cable 85T as the uppermost workpiece 80T in step S7 (an uppermost workpiece determination step). More specifically, in the example illustrated in FIG. 4, for example, the image analyzing portion 40 determines, based on the acquired two-dimensional image VD illustrated in FIG. 4, that the second cable 85B (the uppermost cable 85T) as the soft body portion and the connectors 81, 82 as the rigid body portions are recognizable in terms of the second workpiece 80B including the uppermost cable 85T (YES). After that, in step S7, the image analyzing portion 40 determines the second workpiece 80B including the uppermost cable 85T (the second cable 85B) as the uppermost workpiece 80T.

In the meantime, when the image analyzing portion 40 determines, in step S4, that the uppermost cable 85T (the uppermost soft body portion) is not determinable (NO), the process proceeds to step S11 (a creation procedure consideration step). Here, the image analyzing portion 40 considers a procedure for "creating the uppermost cable 85T (the uppermost soft body portion) by moving one or more workpieces 80 among the workpieces 80 present in the workpiece storage area WS."

Here, the following describes a case where the acquired two-dimensional image VD is a two-dimensional image VD illustrated in FIG. 5. In the two-dimensional image VD illustrated in FIG. 5, the uppermost cable 85T cannot be determined because no cable 85 is placed above the other two cables 85 (that is, no uppermost cable 85T is present) among three cables 85 (the first cable 85A, the second cable 85B, and the third cable 85C). Accordingly, in step S4, the image analyzing portion 40 determines that the uppermost cable 85T (the uppermost soft body portion) is not determinable (NO).

When the image analyzing portion 40 determines, in step S4, that the uppermost cable 85T is not determinable (NO), the process proceeds to step S11. Here, the image analyzing portion 40 considers a procedure for "creating the uppermost cable 85T (the uppermost soft body portion) by moving one or more workpieces 80 among the workpieces 80 present in the workpiece storage area WS." Subsequently, in step S12, the image analyzing portion 40 determines whether or not the uppermost cable 85T (the uppermost soft body portion) is creatable.

In step S11, when the image analyzing portion 40 can find the procedure for creating the uppermost cable 85T, the image analyzing portion 40 determines, in step S12, that the uppermost cable 85T is creatable (YES). In the meantime, when the image analyzing portion 40 cannot find the procedure for creating the uppermost cable 85T in step S11, the image analyzing portion 40 determines, in step S12, that the uppermost cable 85T is not creatable (NO).

More specifically, based on the two-dimensional image VD illustrated in FIG. 5, the image analyzing portion 40 can find that the first cable 85A becomes the uppermost cable 85T (the uppermost soft body portion) (see FIG. 6) by moving the second workpiece 80B (separating the second workpiece 80B from the first workpiece 80A) so that the second workpiece 80B is brought into a state where the second cable 85B does not cross the first cable 85A from a state where the second cable 85B and the first cable 85A cross each other with the second cable 85B being placed above the first cable 85A, for example. When the image analyzing portion 40 can find such a procedure in step S11, the image analyzing portion 40 determines, in step S12, that the uppermost cable 85T is creatable (YES).

When the image analyzing portion 40 determines, in step S12, that the uppermost cable 85T is creatable (YES), the process proceeds to step S13 (a moving step), and the workpiece 80 is moved in accordance with the procedure thus found by the image analyzing portion 40. More specifically, for example, the second workpiece 80B is moved (the second workpiece 80B is separated from the first workpiece 80A) so that the state illustrated in FIG. 5 is changed to a state where the second cable 85B does not cross the first cable 85A. Hereby, the first cable 85A becomes the uppermost cable 85T (the uppermost soft body portion) (see FIG. 6).

More specifically, first, the 3D vision sensor 20 generates pieces of three-dimensional measurement data (three-dimensional image data) of the workpieces 80 placed in the workpiece storage area WS (inside the workpiece storage box 90). After that, the 3D vision controller 60 acquires the pieces of three-dimensional measurement data of the workpieces 80 placed in the workpiece storage area WS, the pieces of three-dimensional measurement data being generated by the 3D vision sensor 20. Then, the 3D vision controller 60 selects three-dimensional measurement data of the rigid body portion (e.g., the connector 82) of the second workpiece 80B to be moved from among the pieces of three-dimensional measurement data thus acquired. Furthermore, the 3D vision controller 60 compares the selected three-dimensional measurement data of the rigid body portion (e.g., the connector 82) with three-dimensional CAD data corresponding to the rigid body portion (e.g., the connector 82), so that the 3D vision controller 60 recognizes (detects) a three-dimensional position and a posture of the rigid body portion (e.g., the connector 82) of the second workpiece 80B to be moved.

Subsequently, the robot controller 50 controls the operations of the articulated arm portion 12 and the gripper 11 of the gripping robot 10 based on the three-dimensional position and the posture of the rigid body portion (e.g., the connector 82) of the second workpiece 80B, the three-dimensional position and the posture being recognized (detected) by the 3D vision controller 60. Hereby, the robot controller 50 causes the gripper 11 to grip the rigid body portion (e.g., the connector 82) of the second workpiece 80B, so that the second workpiece 80B is moved in accordance with the procedure considered by the image analyzing portion 40 (see FIGS. 6 and 7).

Subsequently, the process proceeds to step S14 (a second image capturing step). Here, the 2D vision sensor 30 captures again an image of the workpiece storage area WS (the inside of the workpiece storage box 90) and newly generates a two-dimensional image VD of the inside of the workpiece storage box 90 (see FIG. 8). After that, the process returns to step S3, and the image analyzing portion 40 determines, based on the two-dimensional image VD (see FIG. 8) thus newly generated, whether or not the crossing part CP is present in the workpiece storage area WS, the crossing part CP being a part where the cables 85 (the soft body portions) of the workpieces 80 cross each other in an overlapping manner. After that, the processes of steps S4 to S7 described above are performed based on the newly generated two-dimensional image VD (see FIG. 8).

In the example illustrated in FIG. 8, the first cable 85A (the soft body portion) of the first workpiece 80A can be determined as the uppermost cable 85T (the uppermost soft body portion). Accordingly, in step S4, the image analyzing portion 40 determines that the uppermost cable 85T is determinable (YES), and in step S5, the image analyzing portion 40 confirms the first cable 85A (the soft body portion) as the uppermost cable 85T (the uppermost soft body portion). After that, when the image analyzing portion 40 determines, in step S6, that the first cable 85A (the uppermost cable 85T) as the soft body portion and the connectors 81, 82 as the rigid body portions are recognizable in terms of the first workpiece 80A including the uppermost cable 85T (YES), based on the two-dimensional image VD illustrated in FIG. 8, the process proceeds to step S7. Here, the image analyzing portion 40 determines the first workpiece 80A including the uppermost cable 85T (the first cable 85A) as the uppermost workpiece 80T (see FIG. 8).

Note that, when the image analyzing portion 40 determines that the uppermost cable 85T is not creatable (NO) in step S12, the process proceeds to step S15 (a positional relationship changing step). Here, an operation to change at random the positional relationship between the workpieces 80 present in the workpiece storage area WS (inside the workpiece storage box 90) is performed. More specifically, the robot controller 50 controls the operations of the articulated arm portion 12 and the gripper 11 of the gripping robot 10 so that the workpieces 80 present in the workpiece storage area WS (inside the workpiece storage box 90) are moved at random, for example.

More specifically, by swinging the workpiece storage box 90 by the gripping robot 10, for example, the workpieces 80 present inside the workpiece storage box 90 (the workpiece storage area WS) are moved at random. Alternatively, by mixing the inside of the workpiece storage box 90 by the gripping robot 10, the workpieces 80 present inside the workpiece storage box 90 (the workpiece storage area WS) are moved at random. Hereby, the positional relationship between the workpieces 80 present in the workpiece storage area WS (inside the workpiece storage box 90) is changed at random. By performing such an operation, the uppermost cable 85T (the uppermost soft body portion) can be created. Alternatively, the procedure for creating the uppermost cable 85T can be findable (derivable).

After the process of step S15 is performed, the process proceeds to step S14. Here, the 2D vision sensor 30 captures again an image of the workpiece storage area WS (the inside of the workpiece storage box 90) and newly generates a two-dimensional image VD of the inside of the workpiece storage box 90. After that, the process returns to step S3, and the image analyzing portion 40 determines, based on the two-dimensional image VD thus newly generated, whether or not the crossing part CP is present in the workpiece storage area WS, the crossing part CP being a part where the cables 85 (the soft body portions) of the workpieces 80 cross each other in an overlapping manner. After that, the processes of step S4 and its subsequent steps as described above are performed, so that the uppermost cable 85T and the uppermost workpiece 80T can be confirmed.

As described above, with the workpiece identification method of the present embodiment, the uppermost workpiece 80T placed at the uppermost position among the workpieces 80 can be identified in a case where the workpieces 80 are present (loaded in bulk) in the workpiece storage area WS (inside the workpiece storage box 90) in a state where the soft body portions (the cables 85) of the workpieces 80 cross each other.

When the uppermost workpiece 80T is determined in step S7, the process proceeds to step S8. Here, the rigid body portion (the connector 81 or the connector 82) of the uppermost workpiece 80T is gripped by the gripper 11 of the gripping robot 10, and the uppermost workpiece 80T thus gripped is taken out from the workpiece storage area WS (the inside of the workpiece storage box 90).

More specifically, first, the 3D vision sensor 20 generates three-dimensional measurement data (three-dimensional image data) of the uppermost workpiece 80T placed in the workpiece storage area WS (inside the workpiece storage box 90). After that, the 3D vision controller 60 acquires the three-dimensional measurement data of the uppermost workpiece 80T that is generated by the 3D vision sensor 20. Furthermore, the 3D vision controller 60 detects the rigid body portion (the connector 81 or the connector 82) of the uppermost workpiece 80T from the three-dimensional measurement data thus acquired. The 3D vision controller 60 compares the three-dimensional measurement data of the rigid body portion (the connector 81 or the connector 82) thus detected with three-dimensional CAD data corresponding to the rigid body portion (the connector 81 or the connector 82), so that the 3D vision controller 60 recognizes (detects) a three-dimensional position and a posture of the rigid body portion (the connector 81 or the connector 82) of the uppermost workpiece 80T.

Subsequently, the robot controller 50 controls the operations of the articulated arm portion 12 and the gripper 11 of the gripping robot 10 based on the three-dimensional position and the posture of the rigid body portion (the connector 81 or the connector 82) of the uppermost workpiece 80T, the three-dimensional position and the posture being recognized (detected) by the 3D vision controller 60, so that the rigid body portion (the connector 81 or the connector 82) of the uppermost workpiece 80T is gripped by the gripper 11. For example, the robot controller 50 controls the operations of the articulated arm portion 12 and the gripper 11 of the gripping robot 10 based on the three-dimensional position and the posture of the connector 82 (the rigid body portion) of the uppermost workpiece 80T, the three-dimensional position and the posture being recognized (detected) by the 3D vision controller 60, so that the connector 82 (the rigid body portion) of the uppermost workpiece 80T is gripped by the gripper 11.

After that, the uppermost workpiece 80T gripped by the gripper 11 is taken out from the workpiece storage area WS (the inside of the workpiece storage box 90) by the gripping robot 10 by control by the robot controller 50.

Uppermost Workpiece Identification Test

The following describes an uppermost workpiece identification test. In the test, the number of workpieces 80 to be loaded in bulk in the workpiece storage area WS (inside the workpiece storage box 90) was changed to two, three, or four, and about each case, the test to identify the uppermost workpiece 80T (the workpiece 80 placed at the uppermost position in the workpiece storage area WS) by the workpiece identification method of the embodiment (the workpiece identification method using the gripping device 1 in the embodiment described above) was performed.

More specifically, two workpieces 80 were placed at random (loaded in bulk) in the workpiece storage area WS, for example, and a test to identify and grip the uppermost workpiece 80T by a series of processes of steps S1 to S15 (see FIG. 3) described above was performed several times (e.g., 100 times). The series of processes of steps S1 to S15 is regarded as one cycle. In each test, the cycle process from steps S1 to S15 was performed until the uppermost workpiece 80T was identified and gripped (that is, until the uppermost workpiece 80T was determined in step S7, and the uppermost workpiece 80T was gripped in step S8).

Then, the number of cycles required until the uppermost workpiece 80T was identified and gripped in each test was found, and an uppermost workpiece identification rate (%) in each number of cycles was calculated. Note that an uppermost workpiece identification rate D (%) in each number of cycles corresponds to an identification success rate (equal to a gripping success rate at which the uppermost workpiece 80T was gripped) at which the uppermost workpiece 80T was identified when the series of processes of steps S1 to S15 was performed to each number of cycles. Further, the number of cycles is equal to the number of times the process of step S3 is performed until the uppermost workpiece 80T is identified and gripped. Also in terms of a case where the number of workpieces 80 to be loaded in bulk in the workpiece storage area WS was set to three or four, the test was performed in a similar manner, and the uppermost workpiece identification rate (%) in each number of cycles was calculated. Results are illustrated in Table 1.

Further, for determination (identification) of the uppermost cable 85T (the uppermost soft body portion) from among the cables 85 (the soft body portions) crossing each other in the workpiece storage area WS, the number of images (the number of presentation images, see Table 1) presented to the image analyzing portion 40 in advance is 10 in a case where the number of workpieces 80 loaded in bulk in the workpiece storage area WS is two, the number of images is 30 in a case where the number of workpieces 80 loaded in bulk in the workpiece storage area WS is three, and the number of images is 50 in a case where the number of workpieces 80 loaded in bulk in the workpiece storage area WS is four. More specifically, in a case where the number of workpieces 80 loaded in bulk in the workpiece storage area WS is two, pieces of image data (10 images) of 10 arrangement (bulk) patterns of the workpieces 80, and combination data between each arrangement pattern and its corresponding uppermost cable 85T (the uppermost soft body portion) are presented to the image analyzing portion 40 in advance.

In a case where the number of workpieces 80 loaded in bulk in the workpiece storage area WS is three, pieces of image data (30 images) of 30 arrangement (bulk) patterns of the workpieces 80, and combination data between each arrangement pattern and its corresponding uppermost cable 85T (the uppermost soft body portion) are presented to the image analyzing portion 40 in advance. In a case where the number of workpieces 80 loaded in bulk in the workpiece storage area WS is four, pieces of image data (50 images) of 50 arrangement (bulk) patterns of the workpieces 80, and combination data between each arrangement pattern and its corresponding uppermost cable 85T (the uppermost soft body portion) are presented to the image analyzing portion 40 in advance.

As shown in Table 1, in a case where the number of workpieces 80 loaded in bulk in the workpiece storage area WS was two, the uppermost workpiece identification rate could be 100% in the first cycle. That is, in all tests performed several times (e.g., 100 times), the uppermost workpiece 80T (the uppermost cable 85T) could be identified and gripped by performing only one cycle of the series of processes of steps S1 to S15. In other words, by performing only one cycle of the series of processes of steps S1 to S15, the uppermost workpiece 80T (the uppermost cable 85T) could be identified and gripped with a probability of 100%. Accordingly, it can be said that, in the case where the number of workpieces 80 loaded in bulk in the workpiece storage area WS is two, the uppermost workpiece 80T (the uppermost cable 85T) can be identified and gripped by one cycle.

TABLE 1

| Number of workpieces | Number of presentation images | Uppermost workpiece identification rate | | | |
|---|---|---|---|---|---|
| | | One cycle | Two cycles | Three cycles | Four cycles |
| 2 | 10 | 100% | — | — | — |
| 3 | 30 | 97% | 99% | 100% | — |
| 4 | 50 | 85% | 92% | 99% | 100% |

Further, in a case where the number of workpieces 80 loaded in bulk in the workpiece storage area WS was three, the uppermost workpiece identification rate could be 97% in the first cycle (see Table 1). That is, "a rate of the number of tests in which the uppermost workpiece 80T (the uppermost cable 85T) could be identified and gripped by performing only one cycle of the series of processes of steps S1 to S15" relative to the total number of tests was 97%. In other words, by performing only one cycle of the series of processes of steps S1 to S15, the uppermost workpiece 80T (the uppermost cable 85T) could be identified and gripped with a probability of 97%. For example, in a case where 100 tests were performed, the uppermost workpiece 80T (the uppermost cable 85T) could be identified and gripped by performing only one cycle of the series of processes of steps S1 to S15 in 97 tests.

Further, in a case where the number of workpieces 80 loaded in bulk in the workpiece storage area WS was three, the uppermost workpiece identification rate could be 99% by two cycles (see Table 1). That is, by performing one cycle or two cycles of the series of processes of steps S1 to S15, the uppermost workpiece 80T (the uppermost cable 85T) could be identified and gripped with a probability of 99%. For example, in a case where 100 tests were performed, the uppermost workpiece 80T (the uppermost cable 85T) could be identified and gripped by performing only one cycle or two cycles of the series of processes of steps S1 to S15 in 99 tests.

Further, in the case where the number of workpieces 80 loaded in bulk in the workpiece storage area WS was three, the uppermost workpiece identification rate could be 100% by three cycles (see Table 1). That is, by performing three cycles of the series of processes of steps S1 to S15, the uppermost workpiece 80T (the uppermost cable 85T) could be identified and gripped with a probability of 100%. Accordingly, it can be said that, in the case where the number of workpieces 80 loaded in bulk in the workpiece storage area WS is three, the uppermost workpiece 80T (the uppermost cable 85T) can be identified and gripped within three cycles.

In a case where the number of workpieces 80 loaded in bulk in the workpiece storage area WS was four, the uppermost workpiece identification rate could be 85% in the first cycle (see Table 1). Further, the uppermost workpiece identification rate could be 92% by two cycles. Further, the uppermost workpiece identification rate could be 99% by three cycles. Further, the uppermost workpiece identification rate could be 100% by four cycles. Accordingly, it can be said that, in the case where the number of workpieces 80 loaded in bulk in the workpiece storage area WS is four, the uppermost workpiece 80T (the uppermost cable 85T) can be identified and gripped within four cycles.

From the results of the test, with the use of the workpiece identification method of the present embodiment, the uppermost workpiece 80T placed at the uppermost position among the workpieces 80 can be identified appropriately in a case where the workpieces 80 are present (loaded in bulk) in the workpiece storage area WS (inside the workpiece storage box 90) in a state where the soft body portions (the cables 85) of the workpieces 80 cross each other.

The present disclosure has been described above in line with the embodiment, but the present disclosure is not limited to the above embodiment and can be modified and applied appropriately without departing from the gist of the present disclosure.

For example, the embodiment deals with an example in which the workpiece 80 targeted for identification is a wire harness constituted by the connectors 81, 82 as the rigid body portions and the cable 85 as the soft body portion having a free line shape. However, the workpiece targeted for identification in the present disclosure is not limited to the wire harness, and any workpiece can be targeted for identification, provided that the workpiece has a soft body portion having a free line shape.

More specifically, a workpiece constituted by only a soft body portion having a free line shape may be targeted for identification. In this case, a method for gripping and moving the workpiece by the gripping robot 10 in step S13 can be the following method, for example. For example, three-dimensional CAD data of an end portion having a given shape in the soft body portion is stored in the 3D vision controller 60 in advance. In terms of a workpiece to be moved, three-dimensional measurement data of its end portion that is generated by the 3D vision sensor 20 is compared with the three-dimensional CAD data corresponding to the end portion, so that a three-dimensional position and a posture of the end portion are recognized (detected). After that, based on the recognized (detected) three-dimensional position and the recognized (detected) posture of the end portion, the end portion is gripped by the gripping robot 10 so that the workpiece having the end portion is moved.

What is claimed is:

1. A workpiece identification method comprising:
capturing an image of a workpiece storage area in which a plurality of workpieces are to be placed, the workpieces each including a soft body portion having a free line shape,
determining whether or not the workpieces are present in the workpiece storage area based on the image acquired by the image capturing,
when the workpieces are determined to be present, determining, based on the image, whether or not a crossing part is present in the workpiece storage area, the crossing part being a part where the soft body portions of a plurality of workpieces cross each other in an overlapping manner,
when the crossing part is determined to be present, determining, based on the image, an uppermost soft body portion placed at an uppermost position among the soft body portions crossing each other, and
determining that a workpiece including the uppermost soft body portion thus determined is an uppermost workpiece placed at an uppermost position,
the workpiece identification method further comprising:
when the uppermost soft body portion is not determinable based on the image, considering a procedure for creating the uppermost soft body portion by moving one or more workpieces; and
moving the one or more workpieces in accordance with the procedure found by the consideration so that the uppermost soft body portion is created.

2. The workpiece identification method according to claim 1, comprising:
capturing again an image of the workpiece storage area after the one or more workpieces are moved in accordance with the procedure;
determining again whether or not the crossing part is present in the workpiece storage area based on the image acquired again by the image capturing; and
when the crossing part is determined to be present, determining again the uppermost soft body portion based on the image thus acquired again.

3. The workpiece identification method according to claim 1, comprising:
when the procedure for creating the uppermost soft body portion is not found by the consideration, performing an operation to change at random a positional relationship between the workpieces present in the workpiece storage area;
capturing again an image of the workpiece storage area after the operation;
determining again whether or not the crossing part is present in the workpiece storage area based on the image acquired again by the image capturing; and
when the crossing part is determined to be present, determining again the uppermost soft body portion based on the image thus acquired again.

4. The workpiece identification method according to claim 1, wherein:
the workpieces are workpieces each constituted by the soft body portion and a rigid body portion;
after the uppermost soft body portion is determined but before the uppermost workpiece is determined, whether or not the soft body portion and the rigid body portion are recognizable is determined based on the image in terms of the workpiece including the uppermost soft body portion thus determined; and
when the soft body portion and the rigid body portion are determined to be recognizable, the workpiece including the uppermost soft body portion is determined as the uppermost workpiece.

5. The workpiece identification method according to claim 4, comprising:
when the soft body portion and the rigid body portion are determined to be not recognizable, capturing again an image of the workpiece storage area by changing an angle to capture the image of the workpiece storage area;
determining again whether or not the crossing part is present in the workpiece storage area based on the image acquired again by the image capturing;
when the crossing part is determined to be present, determining again the uppermost soft body portion based on the image thus acquired again; and
determining again whether or not the soft body portion and the rigid body portion are recognizable based on the image thus acquired again in terms of the workpiece including the uppermost soft body portion thus determined again.

* * * * *